(12) United States Patent
Zhang et al.

(10) Patent No.: US 8,564,320 B2
(45) Date of Patent: Oct. 22, 2013

(54) CONNECTION DEVICE FOR QUALITY TESTING OF CHARGE-COUPLED DEVICE MODULES

(75) Inventors: Hao Zhang, Shenzen (CN); Hui Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 236 days.

(21) Appl. No.: 13/116,005

(22) Filed: May 26, 2011

(65) Prior Publication Data

US 2012/0268152 A1 Oct. 25, 2012

(30) Foreign Application Priority Data

Apr. 19, 2011 (CN) .......................... 2011 1 0097402

(51) Int. Cl.
*G01R 31/20* (2006.01)
(52) U.S. Cl.
USPC .................................................... 324/754.11

(58) Field of Classification Search
USPC ................. 324/762.01–762.1, 754.01–754.3, 324/750.3; 257/48; 438/14–18
See application file for complete search history.

(56) References Cited

U.S. PATENT DOCUMENTS 4,942,357 A * 7/1990 Chang ...................... 324/762.09
7,821,278 B2 * 10/2010 Romanov et al. ........ 324/756.07

* cited by examiner

*Primary Examiner* — Tung X Nguyen
(74) *Attorney, Agent, or Firm* — Altis & Wispro Law Group, Inc.

(57) ABSTRACT

A connection device for connecting charge-coupled device (CCD) modules to test apparatuses to test the CCD modules includes a connection unit and a test unit. The connection unit includes a plurality of connection pins. The unit under test is electrically connected to the connection unit and the test apparatuses. When the connection pins are in contact with the CCD modules, the CCD modules are electrically connected to the test apparatuses through the connection unit and the test unit, such that the test apparatus receives electric signals generated by the CCD modules to enable quality testing of the CCD modules.

9 Claims, 4 Drawing Sheets

CONNECTION DEVICE FOR QUALITY TESTING OF CHARGE-COUPLED DEVICE MODULES

BACKGROUND

1. Technical Field

The present disclosure relates to digital camera quality tests, and particularly to a connection device for quality testing of charge-coupled device (CCD) modules of digital cameras.

2. Description of Related Art

Charge-coupled device (CCD) modules are often used in digital cameras. Quality of the CCD modules directly affects image capturing capabilities of the digital cameras; therefore, quality of the CCD modules of the digital cameras requires to be tested. In many quality tests of the CCD modules, such as composite video broadcast signal (CVBS) quality tests, wires are connected to connectors of the CCD modules by solder, and quality test apparatuses (e.g., oscilloscopes, multimeters, etc.) are connected to the CCD modules through these wires. However, since the CCD modules are generally very small, soldering the wires to the CCD modules and detaching the wires from the CCD modules after the quality tests may be very time consuming, and may risk damage the CCD modules.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
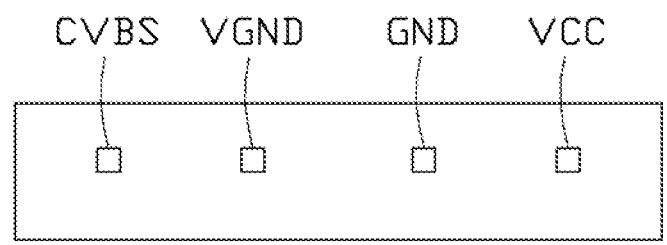
FIG. 1 is a schematic view of an interface of a charge-coupled device (CCD) module of a first type.
Figure 2:
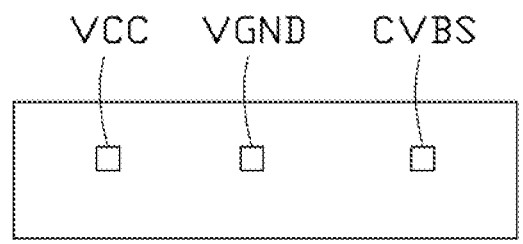
FIG. 2 is a schematic view of an interface of a CCD module of a second type.
Figure 3:
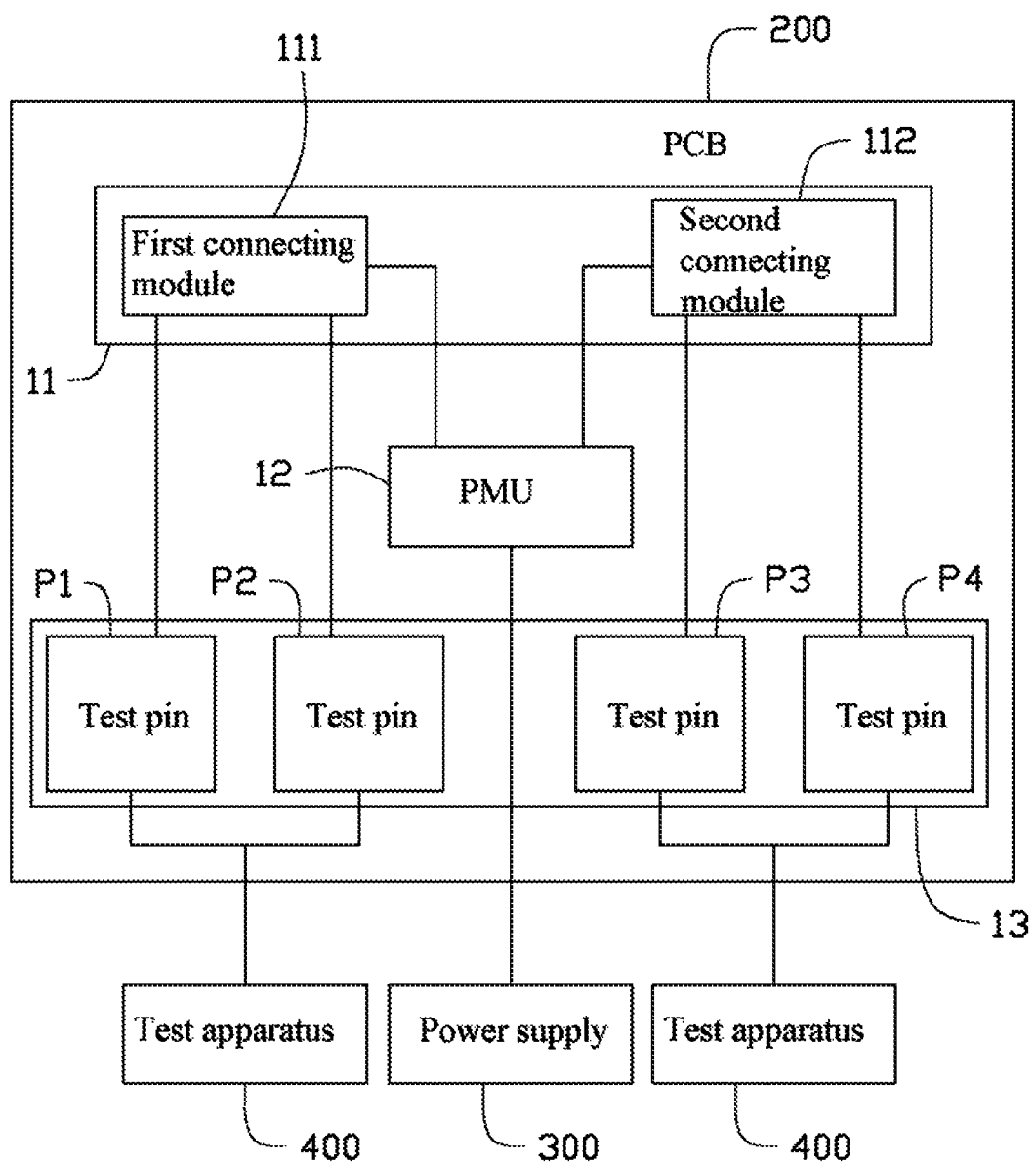
FIG. 3 is a block diagram of a connection device for quality tests of the CCD modules shown in FIG. 1 and FIG. 2, according to an exemplary embodiment.

FIG. 1 and FIG. 2 respectively show two types of common charge-coupled device (CCD) modules 10, 20. Both the two types of CCD modules 10, 20 can be used in digital cameras. The CCD module 10 includes four connector pins, which are respectively a composite video broadcast signal (CVBS) pin CVBS, a video signal ground pin VGND, a system ground pin GND, and a power supply pin VCC. The CCD module 20 includes three connector pins, which are respectively a power supply pin VCC, a video signal ground pin VGND, and a composite video broadcast signal (CVBS) pin CVBS. FIG. 3 shows a connection device 100 for the quality testing of the CCD modules 10, 20, according to an exemplary embodiment. The connection device 100 can electronically connect both the two types of CCD modules 10, 20 to any commonly available test apparatus 400 to test the CVBS quality of the CCD modules 10, 20.

The connection device 100 includes a connection unit 11, a power management unit (PMU) 12, and a test unit 13. All of these, the connection unit 11, the power management unit 12, and the test unit 13 can be integrated on a printed circuit board (PCB) 200 for facilitating the transportation, installation, and use of the connection device 100. The PMU 12 can be electrically connected to a power supply 300. When the CCD modules 10, 20 are electrically connected to the connection device 100, the PMU 12 can supply power from the power supply 300 to the CCD modules 10, 20.

Figure 4:
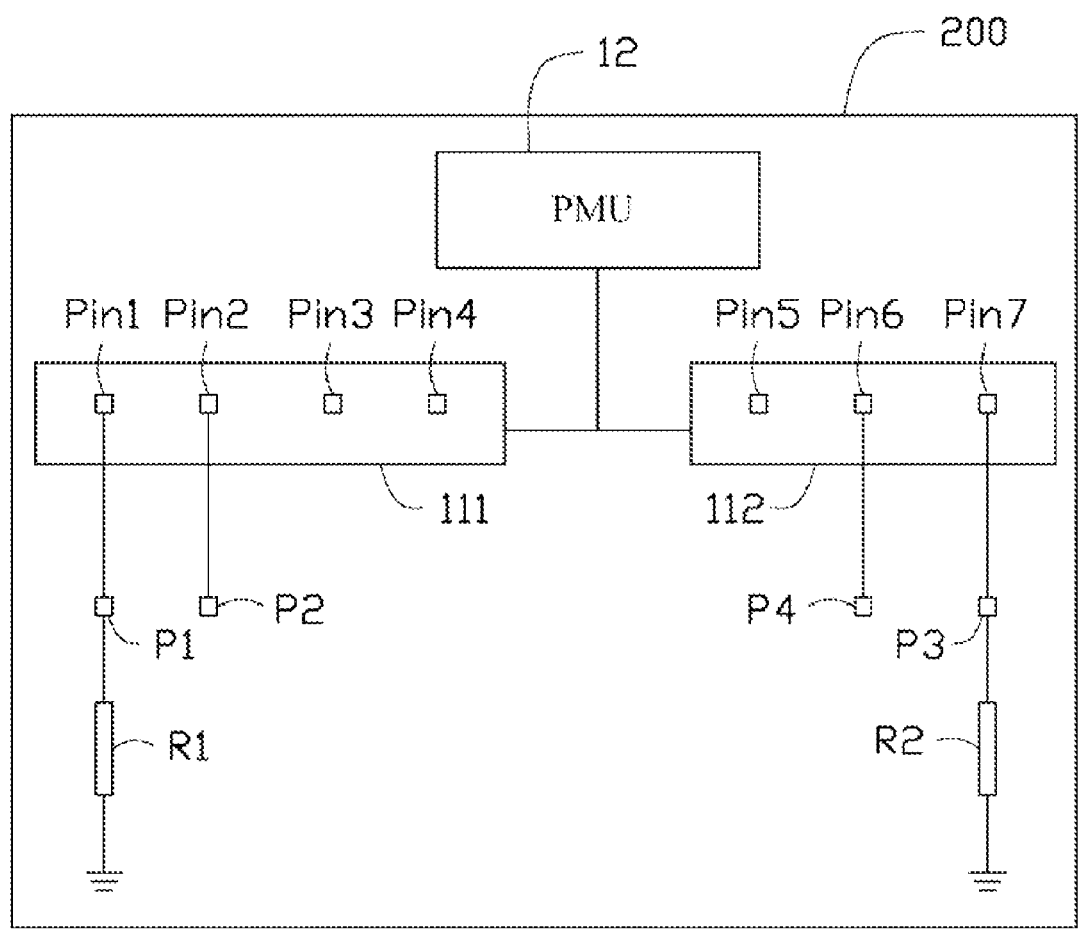
FIG. 4 is a block diagram of the connection unit and the test unit of the connection device shown in FIG. 3.

The connection unit 11 is configured to receive the CCD modules 10, 20 and electrically connect the received CCD modules 10, 20 to the connection device 100. The connection unit 11 includes a first connecting module 111 and a second connecting module 112, which are both electrically connected to the PMU 12. Also referring to FIG. 4, the shapes, sizes, and structures of the first connecting module 111 and the second connecting module 112 respectively correspond to the CCD modules 10, 20, such that the CCD modules 10, 20 can be respectively received in and electrically connected to the first connecting module 111 and the second connecting module 112 for testing, by means of someone of ordinary skill in the art (e.g., slot structures) without using any wires for electric connections.

In this embodiment, the first connecting module 111 includes four connection pins Pins1-4, and the second connecting module 112 includes three connection pins Pins5-7. The positions of connection pins Pins1-4 respectively correspond to that of the CVBS pin CVBS, the video signal ground pin VGND, the system ground pin GND, and the power supply pin VCC of the CCD module 10, and the positions of the connection pins Pins5-7 respectively correspond to that of the power supply pin VCC, the video signal ground pin VGND, and the CVBS pin CVBS of the CCD module 20. When the CCD modules 10, 20 are respectively received in the first connecting module 111 and the second connecting module 112, the connection pins Pins1-4 can be respectively in contact with and thereby electrically connected to the CVBS pin CVBS, the video signal ground pin VGND, the system ground pin GND, and the power supply pin VCC of the CCD module 10, and the connection pins Pins5-7 can be respectively in contact with and thereby electrically connected to the power supply pin VCC, the video signal ground pin VGND, and the CVBS pin CVBS of the CCD module 20. Thus, the CCD modules 10, 20 can be respectively electrically connected to the first and second connecting modules 111 and 112, without the use of wires.

The test unit 13 is electrically connected to the connection unit 11. Commonly available test apparatuses (e.g., oscilloscopes, multimeters, etc.) can be electrically connected to the test unit 13 and measure parameters of the CCD modules 10, 20. In this embodiment, the test unit 13 includes four test pins P1-P4 and two resistors R1 and R2. The test pin P1 is electrically connected to the connection pin Pin1, and is further connected to ground through the resistor R1. The test pin P2 is electrically connected to the connection pin Pin2. The test pin P3 is electrically connected to the connection pin Pin7, and is further connected to ground through the resistor R2. The test pin P4 is electrically connected to the connection pin Pin6. A test apparatus 400 is electrically connected to the test pins P1 and P2. When the CCD module 10 is received in the first connecting module 111, the test apparatus 400 can be electrically connected to the CVBS pin CVBS and the video signal ground VGND of the CCD module 10 through the test pins P1 and P2 and the connection pins Pin1 and Pin2. Another test apparatus 400 is electrically connected to the test pins P3 and P4, and further electrically connected to the second connecting module 112 through the test pins P3 and P4. When the CCD module 20 is received in the second connecting module 112, the test apparatus 400 can be electrically connected to the CVBS pin CVBS and the video signal ground VGND of the CCD module 20 through the test pins P3 and P4 and the connection pins Pin7 and Pin6.

In use, the PMU 12 supplies power to the connection device 100. Each of the CCD modules 10 is received in the first connecting module 111, and is electrically connected to the first connecting module 111 according to the above method. The PMU 12 drives the CCD module 10 to generate electric signals. The test apparatus 400 connected to the test pins P1 and P2 receives electric signals generated by the CVBS pin CVBS of the CCD module 10 through the test pin P1 and the connection pin Pin1, and thereby tests the CVBS quality of the CCD module 10. Each of the CCD modules 20 is received in the second connecting module 112, and is electrically connected to the first connecting module 112 according to the above method. The PMU 12 drives the CCD module 20 to generate electric signals. The test apparatus 400 connected to the test pins P3 and P4 receives electric signals generated by the CVBS pin CVBS of the CCD module 20 through the test pin P3 and the connection pin Pin7, and thereby tests the CVBS quality of the CCD module 20.

The connection unit 11 can further include more first connecting modules 111 and second connecting modules 112. Correspondingly, the test unit 13 can include more test pins similar to the test pins P1-P4 and resistors similar to the resistors R1 and R2, which are electrically connected to the additional first connecting modules 111 and second connecting modules 112 in a layout similar to that of the test pins P1-P4 and the resistors R1 and R2. More test apparatuses 400 can be electrically connected to the additional first connecting modules 111 and second connecting modules 112 through the additional test pins. In this way, the connection device 100 can simultaneously connect a greater number of CCD modules 10, 20 to more than one test apparatuses 400, and thus all items of the test apparatuses 400 can simultaneously test the CVBS quality of all the CCD modules 10, 20.

The present connection device 100 can cooperate with the test apparatuses 400 to test the CVBS quality of both the two types of CCD modules 10, 20. In use, when the CCD modules 10, 20 are assembled to their corresponding connecting modules (i.e., 111 and 112), the CCD modules 10, 20 are electrically connected to the connection device 100 without the use of any wires. Compared with typical CVBS quality test methods that need to solder wires to test CCD modules, the present connection device 100 is easier to use and has higher compatibility.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A connection device for connecting charge-coupled device (CCD) modules to test apparatuses to test quality of the CCD modules, comprising:
a connection unit electrically connecting the CCD modules to the connection device, the connection unit including a plurality of connection pins; and
a test unit electrically connected to the connection unit and the test apparatuses;
wherein the connection unit includes at least one first connecting module for electrically connecting a first type of CCD modules to the connection device, and at least one second connecting module for electrically connecting a second type of CCD modules to the connection device; when the connection pins are in contact with the CCD modules, the CCD modules are electrically connected to the test apparatuses through the connection unit and the test unit, such that the test apparatuses receive electric signals generated by the CCD modules to test quality of the CCD modules.

2. The connection device as claimed in claim 1, wherein each of the first type of CCD modules includes a composite video broadcast signal (CVBS) pin, a video signal ground pin, a system ground pin, and a power supply pin, and the first connecting module correspondingly includes four connection pins; when one of the first type of CCD modules is received in the first connecting module, the four connection pins are respectively in contact with and thereby electrically connected to the CVBS pin, the video signal ground pin, the system ground pin, and the power supply pin of the first type CCD module, such that the first type CCD module is electrically connected to the first connecting module.

3. The connection device as claimed in claim 2, wherein the test unit includes two test pins electrically connect to one of the test apparatuses; the two test pins further respectively electrically connected to the two connection pins that are respectively in contact with and thereby electrically connected to the CVBS pin and the video signal ground pin of the first type CCD module when the first type CCD module is received in the first connecting module, such that the test apparatus is electrically connected to the CVBS pin and the video signal ground pin of the first type CCD module through the two test pins and the two connection pins, and receives electric signals generated by the CVBS pin of the first type CCD module to test CVBS quality of the first type CCD module.

4. The connection device as claimed in claim 3, wherein the test unit further includes a resistor, the test pin electrically connected to the connection pin that is in contact with and thereby electrically connected the CVBS pin of the first type CCD module when the first type CCD module is received in the first connecting module is connected to a ground through the resistor.

5. The connection device as claimed in claim 1, wherein each of the second type of CCD modules includes a power supply pin, a video signal ground pin, and a composite video broadcast signal (CVBS) pin, and the second connecting module correspondingly includes three connection pins; when one of the second type of CCD modules is received in the second connecting module, the three connection pins are respectively in contact with and thereby electrically connected to the power supply pin, the video signal ground pin, and the CVBS pin of the second type CCD module, such that the second type CCD module is electrically connected to the second connecting module.

6. The connection device as claimed in claim 5, wherein the test unit includes two test pins electrically connect to one of the test apparatuses; the two test pins further respectively electrically connected to the two connection pins that are respectively in contact with and thereby electrically connected to the video signal ground pin and the CVBS pin of the second type CCD module when the second type CCD module is received in the second connecting module, such that the test apparatus is electrically connected to the video signal ground pin and the CVBS pin of the second type CCD module through the two test pins and the two connection pins, and receives electric signals generated by the CVBS pin of the second type CCD module to test CVBS quality of the second type CCD module.

7. The connection device as claimed in claim 6, wherein the test unit further includes a resistor, the test pin electrically connected to the connection pin that is in contact with and thereby electrically connected the CVBS pin of the second type CCD module when the second type CCD module is received in the second connecting module is connected to a ground through the resistor.

8. The connection device as claimed in claim 1, further comprising a power management unit (PMU) electrically connected to the connection unit; wherein when the CCD modules are received in the connection unit and electrically connected to the test apparatuses through the connection unit and the test unit, the PMU provides electric power to the CCD modules to drive the CCD modules to work and generate the electric signals received by the test apparatuses for test.

9. The connection device as claimed in claim 1, wherein all of the connection unit, the test unit, and the power management unit are integrated in a printed circuit board (PCB).

* * * * *